US010885181B2

(12) United States Patent
Hassan et al.

(10) Patent No.: US 10,885,181 B2
(45) Date of Patent: Jan. 5, 2021

(54) USABILITY FOR PASSWORD ENTRY

(71) Applicant: Microsoft Technology Licensing, LLC, Redmond, WA (US)

(72) Inventors: Amer Aref Hassan, Kirkland, WA (US); Hooman Shiranimehr, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 15/909,956

(22) Filed: Mar. 1, 2018

(65) Prior Publication Data

US 2019/0272370 A1   Sep. 5, 2019

(51) Int. Cl.
*G06F 21/46* (2013.01)
*G06F 21/31* (2013.01)
*G06F 21/60* (2013.01)

(52) U.S. Cl.
CPC ............ *G06F 21/46* (2013.01); *G06F 21/31* (2013.01); *G06F 21/604* (2013.01)

(58) Field of Classification Search
CPC ................................ G06F 21/46; G06F 21/31
See application file for complete search history.

(56) References Cited

U.S. PATENT DOCUMENTS

| 7,992,008 | B2 | 8/2011 | Ashok et al. | |
| 8,452,980 | B1 * | 5/2013 | Black | G06F 21/554 |
| | | | | 713/185 |
| 9,305,150 | B2 * | 4/2016 | Buck | G06F 21/31 |
| 9,558,335 | B2 * | 1/2017 | Windell | G06F 21/46 |
| 9,811,476 | B2 * | 11/2017 | Maeda | G06F 12/1408 |
| 9,838,384 | B1 * | 12/2017 | Kane-Parry | H04L 63/083 |
| 9,984,246 | B2 * | 5/2018 | Yan | G06F 21/31 |
| 10,025,918 | B2 * | 7/2018 | Stahl | H04L 63/083 |
| 10,754,962 | B2 * | 8/2020 | Gandhi | G06F 21/45 |
| 2005/0015614 | A1 | 1/2005 | Gilfix et al. | |
| 2008/0066167 | A1 * | 3/2008 | Andri | G06F 21/46 |
| | | | | 726/5 |
| 2015/0012988 | A1 * | 1/2015 | Jeng | H04L 63/0838 |
| | | | | 726/7 |
| 2015/0121496 | A1 * | 4/2015 | Caldeira De Andrada | |
| | | | | H04L 63/0861 |
| | | | | 726/7 |

(Continued)

OTHER PUBLICATIONS

Chatterjee, et al., "The TypTop System: Personalized Typo-Tolerant Password Checking", In Proceedings of the ACM SIGSAC Conference on Computer and Communications Security, Oct. 30, 2017, pp. 329-346.

(Continued)

*Primary Examiner* — Lynn D Feild
*Assistant Examiner* — Viral S Lakhia
(74) *Attorney, Agent, or Firm* — Ray Quinney & Nebeker, P.C.; Thomas M. Hardman; Nicholas Chen (57) ABSTRACT

A method for authenticating a password may include receiving a first entered password and determining a difference value between the first entered password and a stored password. The difference value may result from comparing the first entered password to the stored password. The method may also include determining that the difference value does not meet an acceptability standard, denying access to a restricted element, and determining a new acceptability standard.

20 Claims, 6 Drawing Sheets

(56) References Cited

U.S. PATENT DOCUMENTS

| | | | |
|---|---|---|---|
| 2015/0161367 A1* | 6/2015 | Lu | H04L 9/3228 |
| | | | 726/19 |
| 2016/0294804 A1* | 10/2016 | Yamahara | H04L 63/083 |
| 2016/0357971 A1* | 12/2016 | Sinha | H04L 63/10 |
| 2017/0063836 A1* | 3/2017 | Cui | H04L 63/083 |
| 2017/0070494 A1* | 3/2017 | Childress | H04L 63/062 |
| 2018/0173883 A1* | 6/2018 | Gandhi | H04M 1/66 |
| 2018/0262511 A1* | 9/2018 | Guo | H04L 63/102 |

OTHER PUBLICATIONS

Mehler, et al., "Improving Usability through Password-Corrective Hashing", In Proceedings of International Symposium on String Processing and Information Retrieval, Oct. 11, 2006, pp. 1-11.

"Use of Input Distance Metric to implement fuzzy password matching", In IP.Com Journal, IP. Com Inc., Apr. 2, 2015, 2 Pages.

"International Search Report and Written Opinion for PCT Application No. PCT/US2019/019055", dated May 15, 2019, 11 pages.

\* cited by examiner

Stored Password: ABCDEFGH (332)

334:

| Attempt Number | Entered Password | Difference Value | Acceptable Difference Value | Granted Access |
|---|---|---|---|---|
| 1 | ZYXWVU85 | 8 _344a_ | 5 _346a_ | N _348a_ |
| 2 | ABCDEXYZ | 3 _344b_ | 2 _346b_ | N _348b_ |
| 3 | ABCDEFGZ | 1 _344c_ | 1 _346c_ | Y _348c_ |

336:

| Attempt Number | Entered Password | Difference Value | Acceptable Difference Value | Granted Access |
|---|---|---|---|---|
| 1 | ABCDHIJK | 4 _352a_ | 3 _354a_ | N _356a_ |
| 2 | ABCHEIJK | 4 _352b_ | 2 _354b_ | N _356b_ |
| 3 | ABCDEFGH | 0 _352c_ | 1 _354c_ | Y _356c_ |

USABILITY FOR PASSWORD ENTRY

CROSS-REFERENCE TO RELATED APPLICATIONS

N/A

BACKGROUND

There are many different types of computers in use today, including desktop computers, laptop computers, tablet computers, smartphones, virtual reality headsets, wearable computing technology, and the like. Computers may be used to perform a wide variety of tasks, such as accessing websites via the Internet, using word processing software to create documents, playing video games, composing and sending email and/or text messages, watching videos, listening to music, and so forth.

Computers may store a wide variety of information such as email, documents, applications, and digital photographs. Computers may allow users to manipulate and change information stored on the computers. Some information stored on a computer may be personal, sensitive, or proprietary information. As a result, a user may want to be able to access information on a computer while restricting others from accessing information on the computer.

One way for a user to restrict access to a computer is through the use of a password. A user may set up password protection on the computer such that only those who can enter a correct password can get access to the computer and information on the computer. A user may set up password protection specific to certain files or documents on the computer. A user may enter a password on a computer using an input device such as a keyboard.

Passwords may be of different lengths or complexity. Passwords may include letters, numbers, and special characters. Passwords may be easy to remember or difficult to remember. Passwords may be strong passwords or weak passwords.

BRIEF DESCRIPTION OF THE DRAWINGS

In order to describe the manner in which features of the disclosure can be obtained, a description will be rendered by reference to specific embodiments thereof which are illustrated in the appended drawings. For better understanding, similar reference numbers have been used for similar features in the various embodiments. Unless indicated otherwise, these similar features may have the same or similar attributes and serve the same or similar functions. Understanding that the drawings depict some examples of embodiments, the embodiments will be described and explained through the use of the accompanying drawings in which.

DETAILED DESCRIPTION

Passwords may be used to restrict access to devices, information, locations, websites, and databases. Passwords can be complex. It may be desirable to allow some tolerance for error when a user enters a password. In other words, for a password of a given length, it may be desirable to allow a user to enter a password with a certain number of errors and still be authenticated. For example, for a password of ten characters, the password may be considered to be acceptable if the user enters eight of the ten characters correctly.

Providing a tolerance for error increases usability because users do not have to re-enter their passwords when a minor error is made. At the same time, however, providing a tolerance for error weakens security by making passwords more susceptible to brute force attacks. One aspect of the present disclosure improves upon known methods for evaluating passwords by reducing the tolerance for error with successive attempts to enter the password. For example, suppose that two errors are permitted the first time the user attempts to enter the password. If the user does not enter the password correctly on the first attempt (i.e., the user makes more than two errors), then the tolerance for error may be reduced so that only a single error is permitted during the second attempt. If the user does not enter the password correctly on the second attempt (i.e., the user makes more than one error), then the tolerance for error may be further reduced so that no errors are permitted during the third attempt and any subsequent attempts.

Such an approach increases usability by allowing some tolerance for error, without making passwords more susceptible to brute force attacks. Brute force attacks require many attempts in order to correctly guess a password. If the tolerance for error has been reduced to zero within the first few attempts, then a brute force attack would almost certainly not correctly guess the password before the tolerance for error has been reduced to zero.

Figure 1:
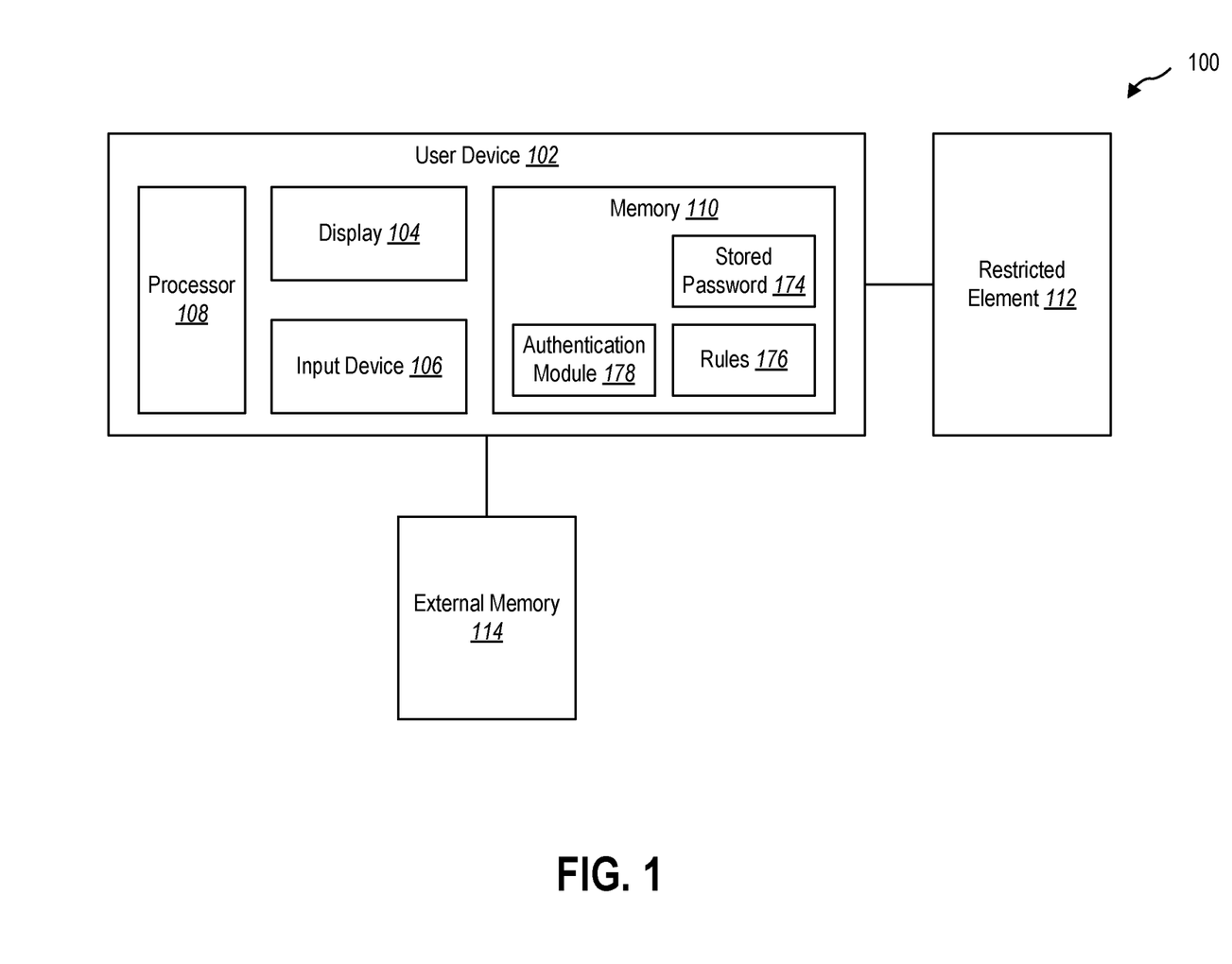
FIG. 1 illustrates one example of a system in which aspects of the present disclosure may be utilized.

FIG. 1 illustrates an example of a system 100 in which aspects of the present disclosure may be utilized. The system 100 includes a user device 102. The user device 102 may include one or more of a display 104, an input device 106, a processor 108, and memory 110. The user device 102 may be used to authenticate a user. The user device 102 may be used to authenticate a user for purposes of granting the user a level of access to a restricted element 112. The restricted element 112 may be a location, information, a device, a system, a website, a database, an object, a file, a video stream, a phone call, or any tangible or intangible thing to which a person may wish to restrict access. The restricted element 112 may be the user device 102, located on the user device 102, or external to the user device 102.

The user device 102 may be a standalone device or a portion of a device. The user device 102 may be a smartphone, a computer, a laptop, a tablet, a kiosk, a control pad of a printer, a garage door keypad, or other system or device or portion of a system or device that can be used to authenticate a user. The user device 102 may have access to external memory 114. The user device 102 may access the external memory 114 through a wired or wireless connection. The user device 102 may access the external memory 114 through a network, an Internet connection, or other means. The user device 102 may include one or more of each of the above components.

The display 104 may be any device or component capable of displaying information. The user device 102 may communicate messages to a user or prompt a user for input using the display 104. The display 104 may also be configured to receive input from a user. For example, a touchscreen display may both display information to the user and receive input through touch.

The input device 106 may be any device that allows a user to communicate information to the user device 102. For example, the input device 106 may be one or more of a keyboard, keypad, number pad, touchscreen, biometric scanner, or microphone. A user may use the input device 106 to enter a password for authenticating the user. The password may be composed of characters such as letters (lower case and capitalized), numbers, special characters, and spaces. The password may also be composed of touchpoints or other interactions with the input device 106. The input device 106 may include the display 104 or a separate display device.

The processor 108 may process and execute instructions stored on the user device 102, the memory 110, or the external memory 114. The memory 110 may be any electronic component capable of storing electronic information. The memory 110 may contain one or more stored passwords 174 for use in authenticating a user and in determining whether to grant the user a level of access to a restricted element. The memory 110 may contain instructions that the processor 108 may use to perform methods disclosed herein.

The memory 110 may contain rules 176 and an authentication module 178. The authentication module 178 and the rules 176 may contain instructions for use in authenticating a user and determining whether to grant a user access to the restricted element 112. The authentication module 178 may include instructions for prompting a user to input an entered password using the input device 106. The authentication module 178 may include instructions for comparing an entered password to one or more of the stored passwords 174. The authentication module 178 may include instructions that authenticate a user even if an entered password is not identical to a stored password. The authentication module 178 may include instructions that authenticate a user and give the user a level of access to the restricted element 112 if an entered password is sufficiently similar to the stored password 174 or is not too different from the stored password 174. The authentication module 178 may include instructions that deny a user access to the restricted element 112 if an entered password is not sufficiently similar to the stored password 174 or is too different from the stored password 174. The rules 176 may contain instructions for determining whether an entered password is acceptable. The rules 176 may contain instructions regarding a threshold similarity or threshold level of similarity that must exist between an entered password and the stored password 174 for a user to be authenticated. The rules 176 may contain instructions regarding a maximum level of difference that may exist between an entered password and the stored password 174 for a user to be authenticated. The rules 176 may also contain instructions regarding how to determine whether an entered password has a threshold similarity or threshold level of similarity to the stored password 174. The rules 176 may also contain instructions regarding how to determine whether an entered password is within a maximum level of difference of the stored password 174. The authentication module 178 may include instructions that allow a user to make more than one attempt to input an entered password within a threshold level of similarity to or within a maximum level of difference of a stored password. The authentication module 178 may include instructions that modify the rules 176 for determining whether an entered password is acceptable after a user makes a failed attempt at authentication. The authentication module 178 may contain instructions that modify the rules 176 such that the threshold level of similarity is increased or the maximum level of difference is decreased. The authentication module 178 may contain instructions that modify the rules 176 such that a user must enter a password more similar to or less different from the stored password 174 on a next authentication attempt than the user was required to enter when making the failed attempt at authentication.

The external memory 114 may be embodied in any form in which the memory 110 may be embodied. The external memory 114 may have stored thereon stored passwords for use in authenticating a user and in determining whether to grant the user access to a restricted element. The memory 114 may have stored thereon instructions that the processor 108 may use to perform methods disclosed herein.

All information stored on the memory 110 may also be stored on the external memory 114. Likewise, all information stored on the external memory 114 may be stored on the memory 110.

Figure 2:
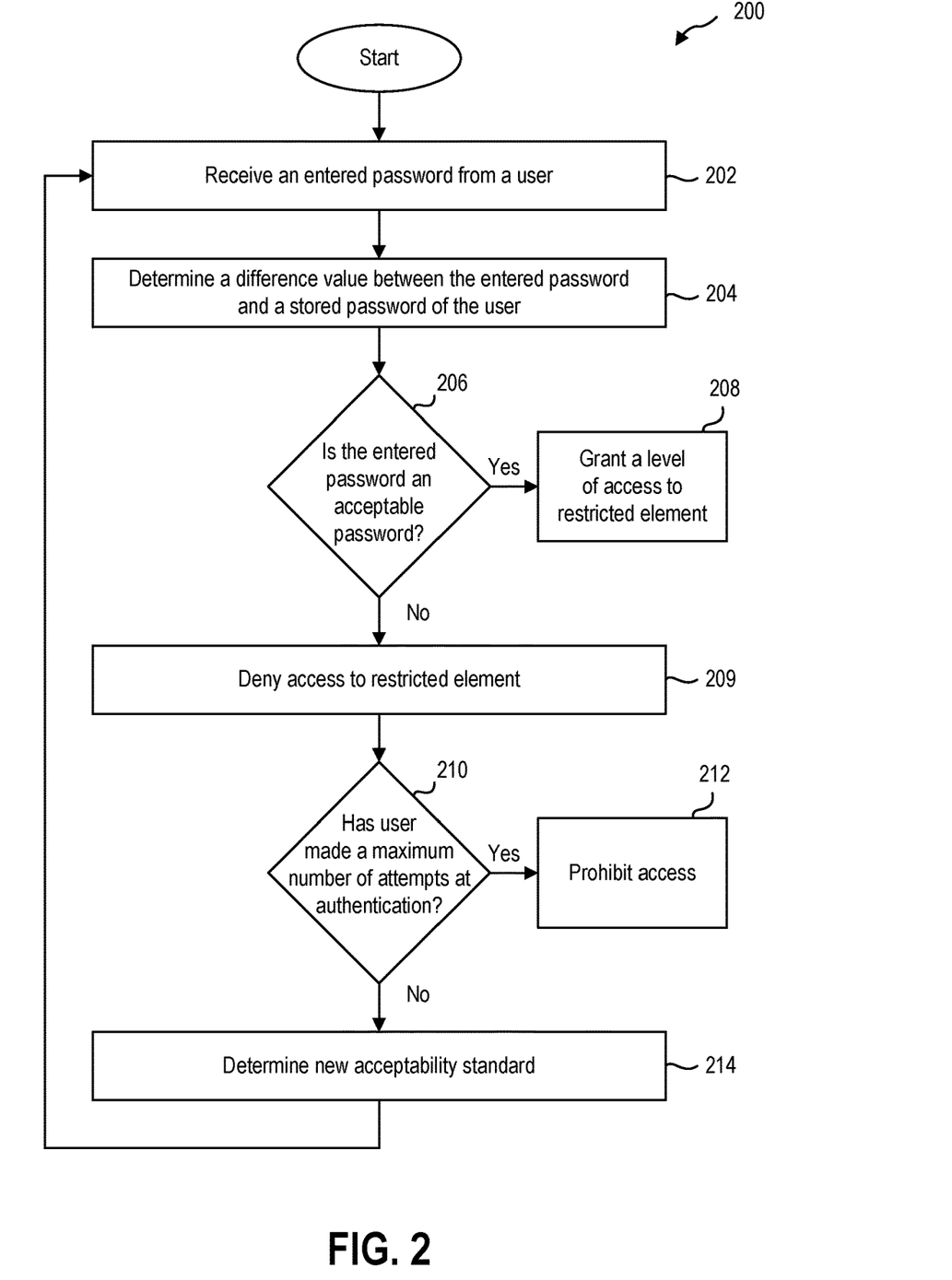
FIG. 2 is a flow diagram that illustrates an example of a method that may be implemented for determining whether to grant a user a level of access to a restricted element in accordance with the present disclosure.

FIG. 2 illustrates one example of a method 200 that may be implemented for determining whether to grant a user a level of access to the restricted element 112. The method 200 may be used for authenticating a user for a purpose other than granting access to a restricted element. The method 200 may reduce a tolerance for error with successive attempts to enter a password. The method 200 may increase usability of a password by tolerating a level of error while minimizing susceptibility of the password to brute force attacks.

The method 200 may be practiced on the user device 102. The method 200 may be practiced using other systems or devices capable of performing the method 200. For purposes of describing the method 200 shown in FIG. 2, this disclosure may make reference to the user device 102. But such reference is for example purposes only and is not in any way meant to limit the disclosed method 200 to being practiced on the user device 102 or to the particular example described herein.

The user device 102 may first receive 202 an entered password from a user. A user may use the input device 106 to input an entered password. A user may input an entered password for purposes of being authenticated and obtaining access to the restricted element 112. An entered password may include one or more characters such as letters (lower case and capitalized), numbers, special characters, and spaces. An entered password may include touchpoints or other interactions with the input device 106.

The user device 102 may receive other information. This information may be information that identifies a user, such as a username or pin.

The user device 102 may then determine 204 a difference value between the entered password and the stored password 174 of the user. The user device 102 may use one or more methods to determine 204 a difference value. Determining 204 a difference value may include comparing an entered password to a stored password. A stored password may be a password entered previously by a user. A stored password may be a password specific to a user. A stored password may be a password standard for all users.

A difference value may be a number of errors in an entered password as compared to a stored password. For example, assume a first entered password with a value of ABC123#, a second entered password with a value of ABC456!, and a stored password with a value of ABC123!. The first entered password may result in a difference value of one (the # should have been a !) while the second entered password may result in a difference value of three (the 4 should have been a 1, the 5 should have been a 2, and the 6 should have been a 3).

A difference value may represent a degree, magnitude, or other measure of similarity or difference between an entered password and a stored password. A difference value may be a numeric value such as a natural number, a whole number, an integer, a ratio, a rational number, or an irrational number. A difference value may be a distribution, a range, a set, a plot, a histogram, a vector, a shape, a graph, a function, or any other mathematical expression.

Determining 204 a difference value may include comparing an entered password and a stored password and determining a measure, degree, or magnitude of difference or similarity between the entered password and the stored password. Determining 204 a difference value may include determining a distance between an entered password and a stored password. Determining 204 a difference value may include determining a Hamming distance, a Levenshtein distance, a Damerau-Levenshtein distance, a restricted Damerau-Levenshtein distance, a longest common substring distance, a g-gram distance, a cosine distance, a Jaccard distance, a Jaro-Winkler distance, or a Jaro distance between an entered password and a stored password. Determining 204 a difference value may include determining a number of differences between an entered password and a stored password.

Determining 204 a difference value may include determining a probability that any differences between an entered password and a stored password resulted from unintentional error.

Determining 204 a difference value may include determining a character distance between each character of an entered password and a stored password, weighting each character distance using one or more factors, and using the weighted character distances to determine the difference value. Determining 204 a difference value may include determining a magnitude of difference between an entered password and a stored password and weighting the magnitude of difference by one or more factors. Physical proximity (which may also be referred to as physical distance or special separation) on an input device (such as a keyboard) between keys may be used to determine a difference value. A difference value may be a distance between an entered password and a stored password weighted by physical proximity on an input device (such as a keyboard) between characters included in the entered password and characters included in the stored password. For example, where characters included in an entered password are physically proximate on a keyboard to characters included in a stored password, a smaller weighting factor may be used than where characters included in an entered password are spatially far apart from characters included in a stored password.

Determining 204 a difference value may include considering or weighting one or more factors, including length of a stored password, length of an entered password, complexity of a stored password, complexity of an entered password, identity of a user, spatial separation on the input device 106 of characters included in an entered password and characters included in a stored password, etc.

The user device 102 may use more than one method for determining a difference value between an entered password and a stored password. The user device 102 may use a different method for determining a difference value between an entered password and a stored password for each attempt a user makes at authentication.

A stored password as disclosed herein may be stored on the user device 102 or in external memory 114. The user device 102 may have access to a single stored password. The user device 102 may have access to more than one stored password and may use one or more of a variety of methods for determining which stored password to use in determining a difference value. For example, the user device 102 may receive a username from a user and use the username to identify a stored password for use in determining a difference value. The user device 102 may compare an entered password to more than one stored password.

After determining 204 a difference value, the user device 102 may determine 206 whether an entered password is an acceptable password. An acceptable password may include a stored password and further include a password not identical to a stored password but a password that will cause the user device 102 to grant a user access to the restricted element 112.

Determining 206 whether an entered password is an acceptable password includes comparing the entered password to a defined set of acceptable passwords.

Determining 206 whether an entered password is an acceptable password may include comparing a difference value to an acceptable difference value. Determining 206 whether an entered password is an acceptable password may include determining whether a difference value satisfies an acceptability standard. An acceptable difference value and an acceptability standard may have been previously set by a user. An acceptable difference value may be specific to a user. An acceptability standard may include an acceptable difference value. An acceptability standard may include a measure of one or more of a threshold number of errors an entered password is allowed to contain, a threshold similarity an entered password must have to a stored password, a threshold difference that is allowed to exist between an entered password and a stored password, or a threshold distance that is allowed to exist between an entered password and a stored password. A threshold number of errors may be a measure of a maximum number of errors an entered password is allowed to contain to be an acceptable password. A threshold similarity may be a measure of a minimum similarity an entered password must have to a stored password in order to be an acceptable password. A threshold distance may be a measure of a maximum distance that is allowed to exist between an entered password and a stored password for an entered password to be an acceptable password.

An acceptable difference value and an acceptability standard may be or include a threshold level or range of error in an entered password as compared to a stored password that the user device 102 will tolerate and still grant access to the restricted element 112. An acceptable difference value and an acceptability standard may be or include a measure or range of how much difference between an entered password and a stored password the user device 102 will tolerate and still grant access to the restricted element 112. An acceptable difference value and an acceptability standard may be or include a threshold measure or range of similarity or closeness that an entered password must have to a stored password for the user device 102 to grant access to the restricted element 112. An acceptable difference value may be a numeric value such as a natural number, a whole number, an integer, a ratio, a rational number, or an irrational number. An acceptable difference value may be a distribution, a range, a set, a plot, a histogram, a vector, a shape, a graph, a function, or any other mathematical expression.

Determining 206 whether an entered password is an acceptable password may include determining whether the entered password is sufficiently similar or close to a stored password. Determining 206 whether an entered password is an acceptable password may include determining whether the entered password contains fewer than a threshold number of errors. Determining 206 whether an entered password is an acceptable password may include determining whether a difference value falls within a range of acceptable difference values.

An entered password may be an acceptable password if a difference value is less than an acceptable difference value. An entered password may be an acceptable password if a difference value is equal to an acceptable difference value. An entered password may be an acceptable password if a difference value is greater than an acceptable difference value.

The user device 102 may use other methods and criteria to determine whether an entered password is an acceptable password. The user device 102 may use information stored on the user device 102 or in external memory 114 in determining 206 whether an entered password is an acceptable password.

If an entered password is an acceptable password, the user device 102 may grant 208 a level of access to the restricted element 112. The user device 102 may grant different levels of access to the restricted element 112. A first level of access may provide access to more information than a second level of access may provide. A first level of access may provide access to more resources than a second level of access.

A user device may grant a level of access based on an identity of a user. A user device may grant a level of access that depends on a number of attempts a user has made at authentication. A user device may grant a level of access that depends on a difference value that results from comparing an entered password to a stored password. For example, assume a situation where a difference value is a numerical value. Also, assume that the lower a difference value, the more similar an entered password is to a stored password. Assume further, for purposes of this example, that an entered password is an acceptable password whenever a difference value is less than 10. Assume also that the user device 102 receives a first entered password that results in a first difference value of 8. Assume also that the user device 102 receives a second entered password that results in a second difference value of 1. The user device 102 may provide access to more resources when the user device 102 receives the second entered password than when the user device 102 receives the first entered password.

If an entered password is not an acceptable password, then the user device 102 may deny 209 access to a restricted element.

If an entered password is not an acceptable password, then the user device 102 may determine 210 whether a user has made a maximum number of attempts at authentication. A maximum number of attempts at authentication may be a numerical value representing a limit on the number of attempts a user may make to enter an acceptable password. A maximum number of attempts may have a value from one to infinity. A maximum number of attempts may be a fixed number of attempts a user can make at authentication. A maximum number of attempts may vary based on identity of the user. A maximum number of attempts may depend on a difference value that results from comparing an entered password to a stored password.

A user may not be given a number of attempts at authentication equal to a maximum number of attempts. Each attempt a user makes at authentication (i.e., each time the user enters a password through a user device) may count as one attempt in determining 210 whether the user has made the maximum number of attempts at authentication. An attempt by a user at authentication may count as more or less than one attempt for purposes of determining 210 whether the user has made a maximum number of attempts at authentication. For example, assume that a difference value of zero means an entered password is identical to a stored password and that a difference value of 100 means an entered password is extremely dissimilar to a stored password. In such a case, assume a user enters a password that results in a difference value in a range of 60 to 100. The user device 102 may determine that such an attempt counts as three attempts for purposes of determining whether the user has made a maximum number of attempts at authentication. If, in the alternative, the user enters a password resulting in a difference value of 15 to 59, the user device 102 may determine that such an attempt counts as two attempts for purposes of determining whether the user has made a maximum number of attempts at authentication. If, in the alternative, the user enters a password resulting in a difference value of 6 to 14, the user device 102 may determine that such an attempt counts as one attempt for purposes of determining whether the user has made a maximum number of attempts at authentication. If, in the alternative, the user enters a password resulting in a difference value of 1 to 5, the user device 102 may determine that such an attempt does not count as an attempt for purposes of determining 210 whether the user has made a maximum number of attempts at authentication.

If a user has made a maximum number of attempts at authentication, then the user device 102 may prohibit 212 access to the restricted element 112. The user device 102 may prohibit a user from making additional attempts at authentication. The user device 102 may cause a user to be prohibited from attempting to access the restricted element 112 for a specified period of time or until the user takes a specified action. The user device 102 may permanently prohibit a user any further opportunity to attempt to access the restricted element 112.

If a user has not made a maximum number of attempts at authentication, then the user device 102 may determine 214 a new acceptability standard. Determining 214 a new acceptability standard may include modifying an acceptable difference value or an acceptability standard such that a tolerance for error is reduced or such that a new acceptability standard has a lower tolerance for error than an acceptability standard. A lower tolerance for error may mean that a new acceptability standard will require an entered password to contain fewer errors in order to be considered an acceptable password than an acceptability standard required. Determining 214 a new acceptability standard may include modifying an acceptable difference value or an acceptability standard such that a user must enter a password more similar or closer to a stored password to be granted a level of access to a restricted element than was required in determining 206 whether an entered password was an acceptable password. Determining 214 a new acceptability standard may include reducing an acceptable difference value by some amount. Determining 214 a new acceptability standard may include changing a range of acceptable difference values. A new acceptability standard may be such that a user must enter a password more similar or closer to a stored password to be granted a level of access to a restricted element than was required in determining 206 whether an entered password was an acceptable password. A new acceptability standard may be such that fewer passwords qualify as acceptable passwords under the new acceptability standard than would qualify as acceptable passwords in determining 206 whether an entered password was an acceptable password.

Determining 214 a new acceptability standard may include leaving unmodified an acceptable difference value or an acceptability standard such that a tolerance for error remains the same. For example, a new acceptability standard may remain unchanged where an acceptable difference value or an acceptability standard requires that an entered password be identical to a stored password.

The user device 102 may determine 214 a new acceptability standard by reducing an acceptable difference value by a fixed amount. For example, assume (1) an acceptable difference value of five, (2) that a difference value greater than the acceptable difference value means that an entered password is not an acceptable password, (3) that the larger a difference value, the less similar an entered password is to a stored password, and (4) that the user device 102 is configured to reduce an acceptable difference value by one with each attempt a user makes at authentication. If a user enters a password that results in a difference value of six, then the user device 102 will determine a new acceptability standard that includes a new acceptable difference value of four (five minus one equals four). If, in the alternative, a user enters a password that results in a difference value of 90, then the user device 102 will reduce the acceptable difference value to four.

The user device 102 may determine 214 a new acceptability standard by reducing an acceptable difference value by a variable amount. An amount by which to reduce an acceptable difference value in determining 214 a new acceptability standard may depend on a difference value resulting from an entered password. For example, assume (1) that a difference value of zero means an entered password is identical to a stored password, (2) that a difference value of 100 means an entered password is not similar to a stored password, and (3) an acceptable difference value of 10. In such a case, if a user enters a password that results in a difference value of 11, the user device 102 may be configured to determine 214 a new acceptability standard by reducing the acceptable difference value by one. If, in the alternative, the user enters a password resulting in a difference value of 90, the user device 102 may be configured to reduce the acceptable difference value by seven.

If a user has not made a maximum number of allowable attempts to enter an acceptable password, the user device 102 may provide the user another opportunity to enter an acceptable password.

The method 200 illustrated in FIG. 2 may increase usability by allowing some tolerance for error without making passwords more susceptible to brute force attacks. Brute force attacks generally require many attempts in order to correctly guess a password. If a tolerance for error has been reduced to zero within a first few attempts, then a brute force attack would almost certainly not correctly guess a password before the tolerance for error has been reduced to zero.

Figure 3:
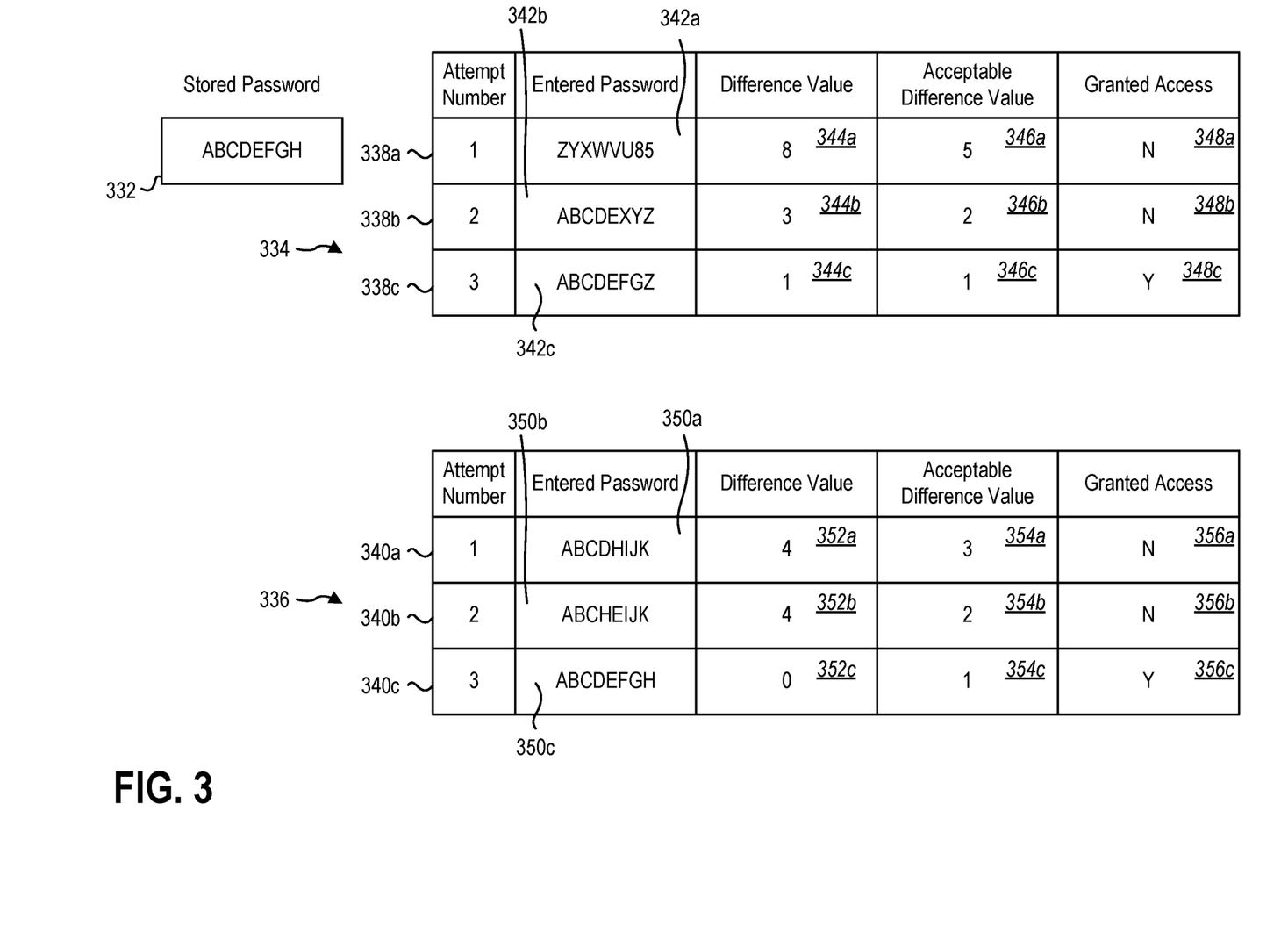
FIG. 3 illustrates an example of determining whether an entered password is an acceptable password in accordance with the present disclosure.

FIG. 3 illustrates one example of how the method 200 shown in FIG. 2 may be applied to certain assumed inputs and values. FIG. 3 shows a stored password 332 having a value for illustration purposes of ABCDEFGH. FIG. 3 also shows two tables, a first table 334 and a second table 336.

The first table 334 illustrates three examples of attempts a user may make at authentication for obtaining access to a restricted element. A first row represents a first attempt 338a, a second row represents a second attempt 338b, and a third row represents a third attempt 338c. For purposes of this illustration, assume a password is an acceptable password if a difference value is not greater than an acceptable difference value. Assume for purposes of this illustration that a difference value is the number of characters in an entered password 342a, 342b, 342c that must be changed in order to change the entered password 342a, 342b, 342c into the stored password 332.

On the first attempt 338a, a user enters a first entered password 342a of ZYXWVU85. In this illustration, for the first entered password 342a, a first difference value 344a of eight is determined. Because the first difference value 344a is greater than a first acceptable difference value 346a of five, the first entered password 342a is not an acceptable password, and the user is not granted access 348a. Assuming for purposes of this illustration that the user has not made a maximum number of attempts at authentication, a new acceptability standard may be determined by determining a second acceptable difference value 346b of two. The second acceptable difference value 346b may result from reducing the first acceptable difference value 346a by the difference of the first difference value 344a of eight and the first acceptable difference value 346a of five. The second acceptable difference value 346b may result from reducing the first acceptable difference value 346a by a fixed amount of three. The second acceptable difference value 346b may result from other methods.

The user may then enter a second entered password 342b. In this illustration, the second entered password 342b has a value of ABCDEXYZ. In this illustration, for the second entered password 342b, a second difference value 344b of three is determined. Because the second difference value 344b is greater than the second acceptable difference value 346b, the second entered password 342b is not an acceptable password, and the user is not granted access 348b. Assuming for purposes of this illustration that the user has not made a maximum number of attempts at authentication, a third acceptable difference value 346c of one may be determined. The third acceptable difference value 346c may result from reducing the second acceptable difference value 346b by the difference of the second difference value 344b and the second acceptable difference value 346b. The third acceptable difference value 346c may result from reducing the second acceptable difference value 346b by a fixed amount of one. The third acceptable difference value 346c may result from other methods.

The user may then enter a third entered password 342c. In this illustration, the third entered password 342c has a value of ABCDEFGZ. In this illustration, for the third entered password 342c, a third difference value 344c of one is determined. Because the third difference value 344c is not greater than the third acceptable difference value 346c, the third entered password 346c is an acceptable password, and the user is granted access 348c.

The second table 336 illustrates three examples of attempts a user may make at authentication. A first row represents a first attempt 340a, a second row represents a second attempt 340b, and a third row represents a third attempt 340c. In this illustration, a password is an acceptable password if a difference value is less than an acceptable difference value. Assume for purposes of this illustration that a difference value is the number of characters in an entered password that must be changed in order to change the entered password into a stored password.

On the first attempt 340a, the user enters a first entered password 350a of ABCDHIJK. In this illustration, for the first entered password 350a, a first difference value 352a of four is determined. Because the first difference value 352a is not less than a first acceptable difference value 354a, the first entered password 350a is not an acceptable password, and the user is not granted access 356a. Assuming for purposes of this illustration that the user has not made a maximum number of attempts at authentication, a second acceptable difference value 354b of two may be determined. The second acceptable difference value 354b may result from reducing the first acceptable difference value 354a by a fixed amount of one. The second acceptable difference value 354b may result from other methods.

The user may then enter a second entered password 350b. In this illustration, the second entered password 350b has a value of ABCHEIJK. In this illustration, for the second entered password 350b, a second difference value 352b of four is determined. Because the second difference value 352b is not less than the second acceptable difference value 354b, the second entered password 350b is not an acceptable password, and the user is not granted access 356b. Assuming for purposes of this illustration that the user has not made a maximum number of attempts at authentication, a third acceptable difference value 354c of one may be determined. The third acceptable difference value 354c may result from reducing the second acceptable difference value 354b by a fixed amount of one. The third acceptable difference value 354c may result from other methods.

The user may then enter a third entered password 350c. In this illustration, the third entered password 350c has a value of ABCDEFGH. In this illustration, for the third entered password 350c, a third difference value 352c of zero is determined. Because the third difference value 352c is less than the third acceptable difference value 354c, the third entered password 350c is an acceptable password, and the user is granted access 356c.

Figure 4:
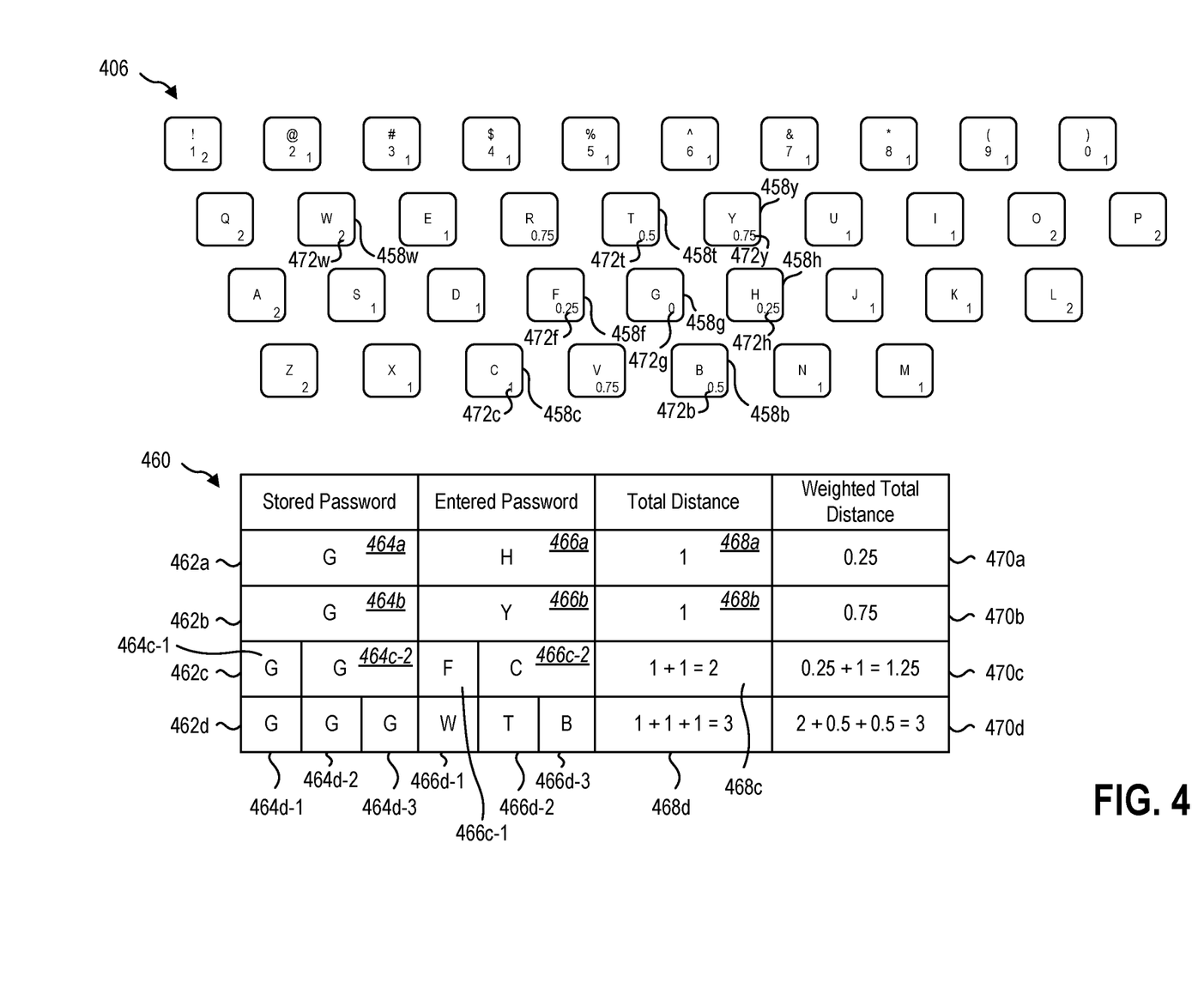
FIG. 4 illustrates an example of determining a weighted total distance between a stored password and an entered password.

FIG. 4 illustrates examples of potential methods for determining a difference value. FIG. 4 shows an input device 406. The input device 406 in this illustration is a representation of a portion of a standard QWERTY keyboard. In this example, the input device 406 is composed of keys 458 with each key 458 representing a letter or a number and a special character.

FIG. 4 shows a table 460 having a first row 462a, a second row 462b, a third row 462c, and a fourth row 462d. The first row 462a illustrates a first stored password 464a, a first entered password 466a, a first total distance 468a, and a first weighted total distance 470a. The first stored password 464a has a value of G. The first entered password 466a has a value of H. For purposes of this illustration, the first total distance 468a represents a minimum number of substitutions required to change the first entered password 466a into the first stored password 464a. In this illustration, because a minimum of one substitution is necessary to change the first entered password 466a into the first stored password 464a (substituting a G for an H), the first total distance 468a has a value of one.

For purposes of this illustration, the first weighted total distance 470a represents a result of one potential method of weighting the first total distance 468a based at least in part on physical distance between keys 458 of the input device 406.

In FIG. 4, each key 458 is assigned a weighted value 472 in relation to a reference key 458g. The weighted value 472 may be or include a measure of physical proximity between a key 458 and the reference key 458g. A distance between two characters that are spatially close to one another on a keyboard (e.g., "z" and "a" on a QWERTY keyboard) may be considered to be relatively small. In contrast, a distance between two characters that are spatially far apart on a keyboard (e.g., "p" and "a" on a QWERTY keyboard) may be considered to be relatively large. Furthermore, a distance between characters that are produced by the same key (e.g., "a" and "A", or "4" and "$" on a standard QWERTY keyboard) may be even smaller than a distance between characters produced by adjacent keys (e.g., "a" and "z"). The weighted value 472 may be lower when two characters are closer together on a keyboard than when two characters are farther apart on a keyboard. Similarly, the weighted value 472 may be lower when two characters are produced by the same key on a keyboard than when two characters are produced by adjacent keys on a keyboard. In FIG. 4, the weighted value 472 is a number. The weighted value 472 may be or include other mathematical expressions.

In this illustration, the reference key 458g represents the letter G. In this example, the weighted value 472 for each key 458 is a value between 0.25 and 2. Weighted values 472 may have a different range. The input device 406 may include different sections and weighted values 472 may vary depending on the section in which a key 458 appears. Weighted values 472 may be determined and assigned using other methods. Each key 458 on an input device may have a different weighted value 472 from the weighted values 472 shown in FIG. 4. Weighting may be based on criteria other than physical distance.

In the example of FIG. 4, the weighted value 472 assigned to each key 458 is in relation to the reference key 458g representing the letter G. Although not shown in FIG. 4, each key 458 may have a distinct weighted value corresponding to each key 458 of the input device 406. In other examples, a table may contain weighted values for each key 458 of the input device 406 in relation to itself, characters it may produce, and each other key 458 of the input device 406.

One potential method for determining the first weighted total distance 470a may be using a weighted value 472h for a key 458h representing the entered password 466a. In this example, the weighted value 472h is 0.25. The first weighted total distance 470a may be determined using a different method. In this example, the first weighted total distance 470a is less than the first total distance 468a. This result may suggest that a difference between the first entered password 466a and the first stored password 464a is more likely the result of a typing error rather than a user entering a random character.

The first total distance 468a may be used as a difference value between the first entered password 466a and the first stored password 464a. The first weighted total distance 470a may be used as a difference value.

A second row 462b illustrates a second stored password 464b, a second entered password 466b, a second total distance 468b, and a second weighted total distance 470b. The second stored password 464b has a value of G. The second entered password 466b has a value of Y. For purposes of this illustration, the second total distance 468b represents a minimum number of substitutions required to change the second entered password 466b into the second stored password 464b. In this illustration, because a minimum of one substitution is necessary to change the second entered password 466b into the second stored password 464c (substituting a G for a Y), the second total distance 468b has a value of one.

For purposes of this illustration, the second weighted total distance 470b is calculated using the same method as the first weighted total distance 470a. To determine the second weighted total distance 470b between the second entered password 466b and the second stored password 464b in this illustration requires determining a weighted value 472y for a key 458y representing the character Y. Because the weighted value 472y is 0.75, the second weighted total distance 470b in this example has a value of 0.75. The second total distance 468b may be used as a difference value between the second entered password 466b and the second stored password 464b. The second weighted total distance 470b may be used as a difference value. The second weighted total distance 470b is greater than the first weighted total distance 470a. This fact may suggest that the difference between the first entered password 466a and the first stored password 464a is more likely the result of a typing error than the difference between the second entered password 466b and the second stored password 464b.

A third row 462c illustrates a third stored password 464c, a third entered password 466c, a third total distance 468c, and a third weighted total distance 470c. The third stored password 464c has a value of GG. Unlike the first stored password 464a and the second stored password 464b, the third stored password 464c includes two characters, a first position stored character 464c-1 and a second position stored character 464c-2. The third entered password 466c likewise includes two characters, a first position entered character 466c-1 and a second position entered character 466c-2. For purposes of this illustration, the third total distance 468c represents a minimum number of substitutions required to change the third entered password 466c into the third stored password 464c. In this illustration, because a minimum of two substitutions is necessary to change the third entered password 466c into the third stored password 464c (substituting a G for an F and a G for a C), the third total distance 468c has a value of two.

For purposes of this illustration, the third weighted total distance 470c is calculated as follows. The first position entered character 466c-1 has a first character weighted distance of 0.25 from the first position stored character 464c-1 because a weighted value 472f for a key 458f representing the character F is 0.25 (if the first position entered character 466c-1 had been a G, the first character weighted distance would have been zero). The second position entered character 466c-2 has a second character weighted distance of one from the second position stored character 464c-2 because a weighted value 472c of a key 458c representing the character C is one. To determine the third weighted total distance 470c between the third entered password 466c and the third stored password 464c in this illustration requires adding the first character weighted distance and the second character weighted distance, resulting in the third weighted total distance 470c having a value of 1.25.

A fourth row 462d illustrates a fourth stored password 464d, a fourth entered password 466d, a fourth total distance 468d, and a fourth weighted total distance 470d. The fourth stored password 464d has a value of GGG. The fourth stored password 464d includes three characters, a first position stored character 464d-1, a second position stored character 464d-2, and a third position stored character 464d-3. The fourth entered password 466d likewise includes three characters, a first position entered character 466d-1, a second position entered character 466d-2, and a third position entered character 466d-3. For purposes of this illustration, the fourth total distance 468d represents a minimum number of substitutions required to change the fourth entered password 466d into the fourth stored password 464d. In this illustration, because a minimum of three substitutions is necessary to change the fourth entered password 466d into the fourth stored password 464d (substituting a G for a W, a G for a T, and a G for a B), the fourth total distance 468d has a value of three.

For purposes of this illustration, the fourth weighted total distance 470d is calculated using the same method as was used in determining the third weighted total distance 470c. The first position entered character 466d-1 has a first character weighted distance of 2 from the first position stored character 464d-1 because a weighted value 472w for a key 458w representing the character W in this illustration is 2. The second position entered character 466d-2 has a second character weighted distance of 0.5 from the second position stored character 464d-2 because a weighted value 472t of a key 458t representing the character T in this illustration is 0.5. The third position entered character 466d-3 has a third character weighted distance of 0.5 from the third position stored character 464d-3 because a weighted value 472b of a key 458b representing the character B is 0.5. To determine the fourth weighted total distance 470d between the fourth entered password 466d and the fourth stored password 464d in this illustration requires adding the first character weighted distance to the second character weighted distance and the third character weighted distance, resulting in the fourth weighted total distance 470d having a value of 3. The fourth weighted total distance 470d is equal to the fourth total distance 468d. This fact may suggest that the difference between the fourth entered password 466d and the fourth stored password 464d is not more likely to be the result of a typing error than the result of a user entering random characters.

In the examples shown in FIG. 4, weighting was done on a character-by-character basis. Weighting may be done using a different method, such as applying one or more weighting factors to a total distance between a stored password and an entered password.

In the examples shown in FIG. 4, each entered password has a number of characters equal to a corresponding entered password. In other examples, the user device 102 may calculate a distance between an entered password that includes a number of characters not equal to a number of characters in a stored password. Determining a distance (or a difference value) between an entered password and a stored password may include determining a Levenshtein distance. For example, a Levenshtein distance between an entered password of ABC and a stored password of ABCD may be one. In another example, the user device 102 may determine a Levenshtein distance between an entered password of ABCDEFG and a stored password of ABC12 of four.

Figure 5:
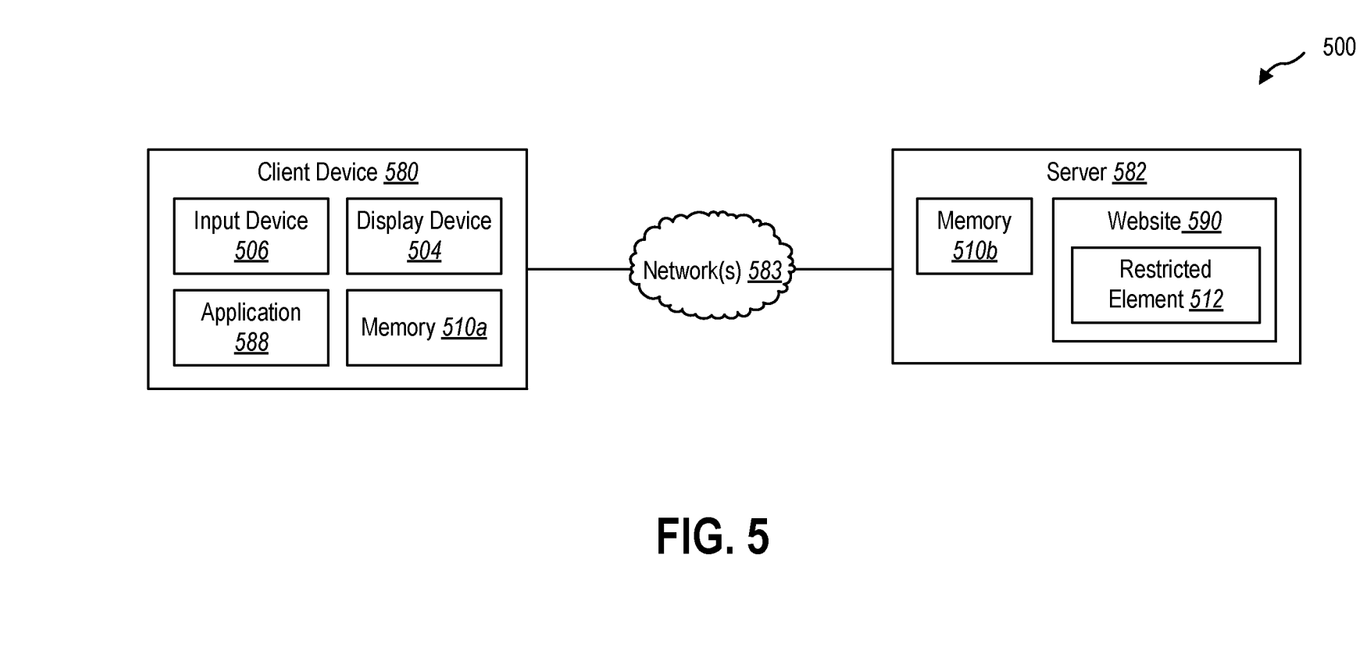
FIG. 5 illustrates an example of a system that may be utilized to implement a method for determining whether to grant a user a level of access to a restricted element in accordance with the present disclosure.

FIG. 5 illustrates another example of a system 500 for implementing the method 200. A client device 580 is shown in electronic communication with a server 582 over one or more networks 583, which may include the Internet. The client device 580 includes an input device 506, a display device 504, memory 510a, and an application 588. The application 588 may include instructions for a graphical user interface. The server 582 includes a restricted element 512 and memory 510b. The restricted element 512 may be part of a website 590. The memory 510b may include a stored password.

A user may want to access the restricted element 512. A user may use the client device 580 to access the website 590. The website 590 may prompt the client device 580 to ask a user to input an entered password using the input device 506. A user may input an entered password using the input device 506. The client device 580 may communicate the entered password to the server 582. The server 582 may use the method 200 to determine whether to grant a user access to the restricted element 512. The server 582 may determine 206 whether an entered password is an acceptable password. If an entered password is not an acceptable password, the server 582 may deny 209 access to the restricted element 512, determine 214 a new acceptability standard, and may cause the client device 580 to provide a user an opportunity to enter a second entered password.

If a user enters an acceptable password, the server 582 may grant the user access to the restricted element 512 on the website 590. The restricted element 512 may include personal or business information. The server 582 may cause the client device 580 to use the display device 504 to display the restricted element 512 to a user. The restricted element 512 may be displayed to a user in such a way as to allow the user to manipulate and change the restricted element 512 using the client device 580. For example, the restricted element 512 may be a text document, and a user may use the client device 580 to add, delete, or modify text in the text document. Where the restricted element 512 is billing information, a user may use the client device 580 to change a user's billing address.

Accessing the restricted element 512 may enable a user to perform an action the user could not perform without access to the restricted element 512. For example, where the restricted element 512 is a digital stream of a movie or television program, accessing the restricted element 512 enables a user to view the movie or television program on the client device 580. Where the restricted element 512 is a user's credit card account, accessing the restricted element 512 may allow a user to make payments using the client device 580. Where the restricted element 512 is a user's email account, accessing the restricted element 512 may allow a user to compose, send, receive, read, and organize emails using the client device 580.

Figure 6:
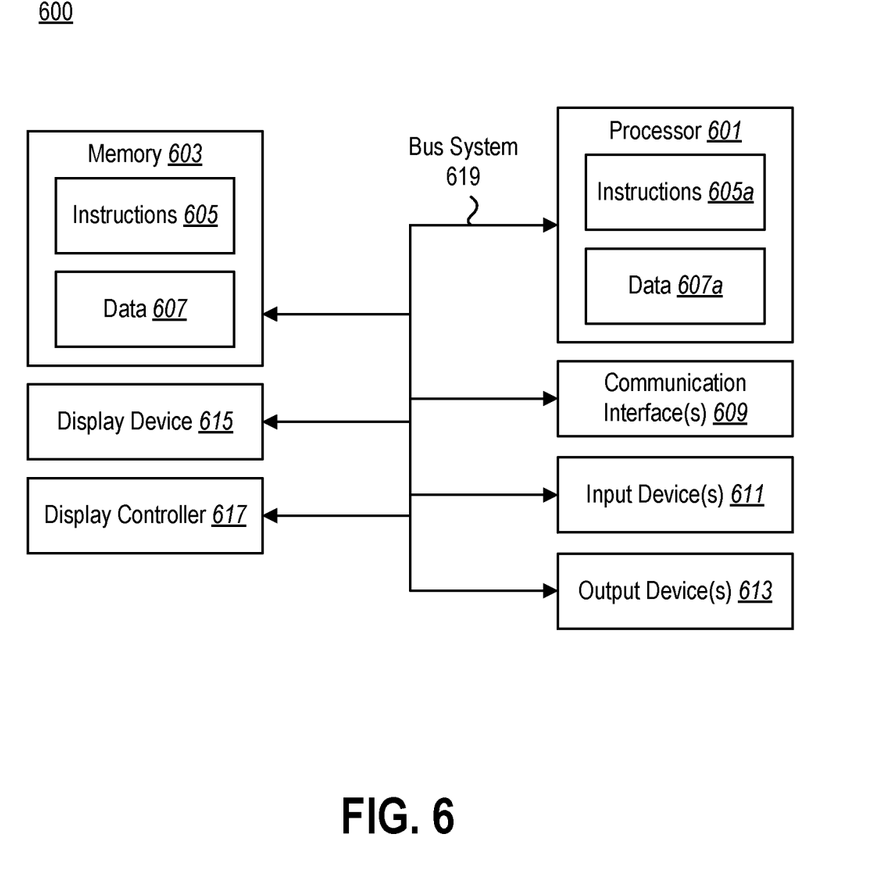
FIG. 6 illustrates certain components that may be included within a computer system.

FIG. 6 illustrates certain components that may be included within a computer system 600. One or more computer systems 600 may be used to implement the techniques disclosed herein, such as the method 200 shown in FIG. 2. The various computing devices described above (e.g., the user device 102, client device 580, server 582) may be implemented with some or all of the components shown in the computer system 600.

The computer system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the methods disclosed herein. Executing the instructions 605 may involve the use of the data 607 that is stored in the memory 603. When the processor 601 executes the instructions 605, various portions of the instructions 605a may be loaded onto the processor 601, and various pieces of data 607a may be loaded onto the processor 601.

Any of the various examples of modules and components described herein (such as receiving 202 an entered password, determining 204 a difference value between an entered password and a stored password, determining 206 whether an entered password is an acceptable password, and determining 214 a new acceptability standard) may be implemented, partially or wholly, as instructions 605 stored in memory 603 and executed by the processor 601. Any of the various examples of data, values, or information described herein may be among the data 607 that is stored in memory 603 and used during execution of the instructions 605 by the processor 601.

A computer system 600 may also include one or more communication interfaces 609 for communicating with other electronic devices. The communication interfaces 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker, printer, etc. One specific type of output device that is typically included in a computer system is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

A method for authenticating a password is disclosed. The method may be implemented by a computer system comprising one or more processors. The method may include receiving a first entered password and determining a difference value between the first entered password and a stored password. The difference value may result from comparing the first entered password to the stored password. The method may also include determining that the difference value does not meet an acceptability standard, denying access to a restricted element, and determining a new acceptability standard.

The method may also include receiving a second entered password and determining a second difference value between the second entered password and the stored password. The second difference value may result from comparing the second entered password to the stored password. The method may also include determining that the second difference value meets the new acceptability standard and granting a level of access to the restricted element. The level of access granted may be based on a comparison of the second difference value and the new acceptability standard.

The method may also include determining, based at least in part on the difference value, whether a maximum number of attempts to enter an acceptable password have been made.

The difference value may measure one or more of a number of errors in the first entered password, a similarity of the first entered password to the stored password, a difference between the first entered password and the stored password, or a distance between the first entered password and the stored password.

The acceptability standard and the new acceptability standard may comprise a measure of one or more of a threshold number of errors the first entered password is allowed to contain, a threshold similarity the first entered password must have to the stored password, a threshold difference that is allowed to exist between the first entered password and the stored password, or a threshold distance that is allowed to exist between the first entered password and the stored password.

Determining the difference value may comprise determining one or more of a Hamming distance or a Levenshtein distance between the first entered password and the stored password.

The new acceptability standard may include a lower tolerance for error than the acceptability standard.

The new acceptability standard may be stricter than the acceptability standard.

The first entered password and the stored password may comprise one or more characters and determining the difference value may comprise considering spatial separation on an input device between characters of the first entered password and the stored password.

A system for authenticating a password is disclosed. The system may include one or more processors and memory comprising instructions that are executable by the one or more processors to perform certain operations. The operations may include receiving an entered password and determining a difference value between the entered password and a stored password. The difference value may result from comparing the entered password to the stored password. The operations may also include determining that the difference value does not meet an acceptability standard, denying access to a restricted element, and determining a new acceptability standard.

A computer-readable medium is also disclosed. The computer-readable medium may include computer-executable instructions stored thereon that, when executed, cause one or more processors to perform certain operations. The operations may include receiving an entered password and determining a difference value between the entered password and a stored password. The difference value may result from comparing the entered password to the stored password. The operations may also include determining that the difference value does not meet an acceptability standard, denying access to a restricted element, and determining a new acceptability standard.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for authenticating a password, the method being implemented by a computer system comprising one or more processors, the method comprising:
   receiving a first entered password;
   determining that the first entered password does not satisfy a first acceptability standard corresponding to a stored password, the first acceptability standard comprising a first tolerance for error;
   denying access to a restricted element in response to determining that the first entered password does not satisfy the first acceptability standard;

determining a second acceptability standard in response to determining that the first entered password does not satisfy the first acceptability standard, wherein the second acceptability standard has a second tolerance for error, and wherein the second tolerance for error is lower than the first tolerance for error;

receiving a second entered password;

determining that the second entered password does not match the stored password and also that the second entered password satisfies the second acceptability standard; and permitting a level of access to the restricted element in response to determining that the second entered password satisfies the second acceptability standard.

2. The method of claim 1, wherein:
determining that the first entered password does not satisfy the first acceptability standard comprises determining a first difference value;
determining that the second entered password satisfies the second acceptability standard comprises determining a second difference value; and
a difference value represents a degree of similarity or difference between an entered password and the stored password.

3. The method of claim 2, further comprising
determining that a maximum number of attempts to enter an acceptable password has not been made;
counting a user attempt at authentication as more or less than one attempt toward the maximum number of attempts based at least in part on a difference value.

4. The method of claim 1, wherein:
determining that the first entered password does not satisfy the first acceptability standard comprises determining a first difference value;
determining that the second entered password satisfies the second acceptability standard comprises determining a second difference value; and
a difference value measures one or more of a number of errors in an entered password, a similarity of the entered password to the stored password, a difference between the entered password and the stored password, or a distance between the entered password and the stored password.

5. The method of claim 1, wherein an acceptability standard comprises a measure of one or more of a threshold number of errors that an entered password is allowed to contain, a threshold similarity the entered password must have to the stored password, a threshold difference that is allowed to exist between the entered password and the stored password, or a threshold distance that is allowed to exist between the entered password and the stored password.

6. The method of claim 1, wherein:
determining that the first entered password does not satisfy the first acceptability standard comprises determining a first difference value;
determining that the second entered password satisfies the second acceptability standard comprises determining a second difference value; and
determining a difference value comprises determining one or more of a Hamming distance or a Levenshtein distance between an entered password and the stored password.

7. The method of claim 1, wherein the second acceptability standard is stricter than the first acceptability standard.

8. The method of claim 1, wherein:
determining that the first entered password does not satisfy the first acceptability standard comprises determining a first difference value;
determining that the second entered password satisfies the second acceptability standard comprises determining a second difference value; and
determining a difference value corresponding to an entered password comprises considering spatial separation on an input device between characters of the entered password and the stored password.

9. The method of claim 2, wherein the level of access granted is based on a comparison of the second difference value and the second acceptability standard.

10. A system for authenticating a password, comprising:
one or more processors; and
memory comprising instructions that are executable by the one or more processors to perform operations comprising:
receiving a first entered password;
determining that the first entered password does not satisfy a first acceptability standard corresponding to a stored password, the first acceptability standard comprising a first tolerance for error;
denying access to a restricted element in response to determining that the first entered password does not satisfy the first acceptability standard;
determining a second acceptability standard in response to determining that the first entered password does not satisfy the first acceptability standard, wherein the second acceptability standard has a second tolerance for error, and wherein the second tolerance for error is lower than the first tolerance for error;
receiving a second entered password;
determining that the second entered password does not match the stored password and also that the second entered password satisfies the second acceptability standard; and
permitting access to the restricted element in response to determining that the second entered password satisfies the second acceptability standard.

11. The system of claim 10, wherein:
determining that the first entered password does not satisfy the first acceptability standard comprises determining a first difference value;
determining that the second entered password satisfies the second acceptability standard comprises determining a second difference value; and
a difference value measures one or more of a number of errors in an entered password, a similarity of the entered password to the stored password, a difference between the entered password and the stored password, or a distance between the entered password and the stored password.

12. The system of claim 10, wherein an acceptability standard comprises a measure of one or more of a threshold number of errors that an entered password is allowed to contain, a threshold similarity the entered password must have to the stored password, a threshold difference that is allowed to exist between the entered password and the stored password, or a threshold distance that is allowed to exist between the entered password and the stored password.

13. The system of claim 10, wherein the second acceptability standard is stricter than the first acceptability standard.

14. The system of claim 10, wherein:
- determining that the first entered password does not satisfy the first acceptability standard comprises determining a first difference value;
- determining that the second entered password satisfies the second acceptability standard comprises determining a second difference value; and
- determining a difference value corresponding to an entered password comprises considering spatial separation on an input device between characters of the entered password and the stored password.

15. The system of claim 10, wherein:
- determining that the first entered password does not satisfy the first acceptability standard comprises determining a first difference value;
- determining that the second entered password satisfies the second acceptability standard comprises determining a second difference value; and
- a difference value represents a degree of similarity or difference between an entered password and the stored password.

16. A computer-readable medium having computer-executable instructions stored thereon that, when executed, cause one or more processors to perform operations comprising:
- receiving a first entered password;
- determining that the first entered password does not satisfy a first acceptability standard corresponding to a stored password, the first acceptability standard comprising a first tolerance for error;
- denying access to a restricted element in response to determining that the first entered password does not satisfy the first acceptability standard;
- determining a second acceptability standard in response to determining that the first entered password does not satisfy the first acceptability standard, wherein the second acceptability standard has a second tolerance for error, and wherein the second tolerance for error is lower than the first tolerance for error;
- receiving a second entered password;
- determining that the second entered password does not match the stored password and also that the second entered password satisfies the second acceptability standard; and
- permitting a level of access to the restricted element in response to determining that the second entered password satisfies the second acceptability standard.

17. The computer-readable medium of claim 16, wherein:
- determining that the first entered password does not satisfy the first acceptability standard comprises determining a first difference value;
- determining that the second entered password satisfies the second acceptability standard comprises determining a second difference value; and
- a difference value measures one or more of a number of errors in an entered password, a similarity of the entered password to the stored password, a difference between the entered password and the stored password, or a distance between the entered password and the stored password.

18. The computer-readable medium of claim 16, wherein an acceptability standard comprises a measure of one or more of a threshold number of errors that an entered password is allowed to contain, a threshold similarity the entered password must have to the stored password, a threshold difference that is allowed to exist between the entered password and the stored password, or a threshold distance that is allowed to exist between the entered password and the stored password.

19. The computer-readable medium of claim 16, wherein the second acceptability standard is stricter than the first acceptability standard.

20. The computer-readable medium of claim 16, wherein:
- determining that the first entered password does not satisfy the first acceptability standard comprises determining a first difference value;
- determining that the second entered password satisfies the second acceptability standard comprises determining a second difference value; and
- determining a difference value corresponding to an entered password comprises considering spatial separation on an input device between characters of the entered password and the stored password.

* * * * *